US012285059B2

(12) United States Patent
Lee

(10) Patent No.: US 12,285,059 B2
(45) Date of Patent: Apr. 29, 2025

(54) ATHLETIC BRA

(71) Applicant: PUMA SE, Herzogenaurach (DE)

(72) Inventor: Yuen Wa Angela Lee, Hong Kong (HK)

(73) Assignee: PUMA SE, Herzogenaurach (DE)

( * ) Notice: Subject to any disclaimer, the term of this patent is extended or adjusted under 35 U.S.C. 154(b) by 138 days.

(21) Appl. No.: 17/747,765

(22) Filed: May 18, 2022

(65) Prior Publication Data

US 2022/0369728 A1 Nov. 24, 2022

Related U.S. Application Data

(60) Provisional application No. 63/191,082, filed on May 20, 2021.

(51) Int. Cl.
*A41C 3/00* (2006.01)
*B32B 5/02* (2006.01)
*B32B 5/18* (2006.01)
*B32B 5/24* (2006.01)
*B32B 7/12* (2006.01)

(52) U.S. Cl.
CPC .......... *A41C 3/0057* (2013.01); *A41C 3/0028* (2013.01); *B32B 5/024* (2013.01); *B32B 5/18* (2013.01); *B32B 5/245* (2013.01); *B32B 7/12* (2013.01); *B32B 2255/02* (2013.01); *B32B 2255/26* (2013.01); *B32B 2262/0261* (2013.01); *B32B 2437/00* (2013.01)

(58) Field of Classification Search
CPC ...... A41C 3/0014; A41C 3/0057; A41C 3/144

USPC ........................................................... 450/20
See application file for complete search history.

(56) References Cited

U.S. PATENT DOCUMENTS

| | | | |
|---|---|---|---|
| 6,083,080 A | 7/2000 | Lawson et al. | |
| 6,659,841 B2 * | 12/2003 | Raimondo | A41C 3/04 450/36 |
| 7,731,564 B2 * | 6/2010 | Sanders | A41C 1/003 450/39 |
| 10,010,117 B1 | 7/2018 | Rendone | |
| 10,028,540 B2 | 7/2018 | Shearer | |
| 10,045,578 B2 | 8/2018 | Kovatch | |
| 10,051,896 B2 | 8/2018 | Miller et al. | |
| 10,104,918 B2 | 10/2018 | Hurd | |
| 10,123,575 B2 | 11/2018 | Funk-Danielson et al. | |
| 11,406,141 B2 * | 8/2022 | Lucas Gaus | A41C 3/144 |
| 2002/0106970 A1 * | 8/2002 | Falla | A41B 17/00 450/1 |
| 2005/0255789 A1 | 11/2005 | Gaudet et al. | |
| 2008/0003922 A1 | 1/2008 | Hori | |
| 2013/0316615 A1 | 11/2013 | Hurd | |

(Continued)

OTHER PUBLICATIONS

International Search Report of International Application No. PCT/IB2022/054632, mailed Aug. 29, 2022 (6 pages).

(Continued)

*Primary Examiner* — Timothy K Trieu
(74) *Attorney, Agent, or Firm* — Quarles & Brady LLP

(57) ABSTRACT

An athletic bra comprising an outer shell and an inner layer is provided. The outer shell is configured to lay distal from a wearer when the athletic bra is worn, and the outer shell includes a fabric comprising polyamide and spandex. The inner layer is configured to lay more proximal to the wearer than the outer shell when the athletic bra is worn.

18 Claims, 8 Drawing Sheets

(56) References Cited

U.S. PATENT DOCUMENTS

| | | | | |
|---|---|---|---|---|
| 2015/0044943 A1* | 2/2015 | Marshall | ................ | A41C 3/005 2/69 |
| 2016/0044971 A1* | 2/2016 | Randall | ................ | A41C 3/142 450/39 |
| 2018/0279692 A1* | 10/2018 | Witek | ................ | A41C 3/0057 |
| 2020/0085113 A1* | 3/2020 | Rendone | ................ | A41C 3/10 |

OTHER PUBLICATIONS

Written Opinion of International Application No. PCT/IB2022/054632, mailed Aug. 29, 2022 (6 pages).

* cited by examiner

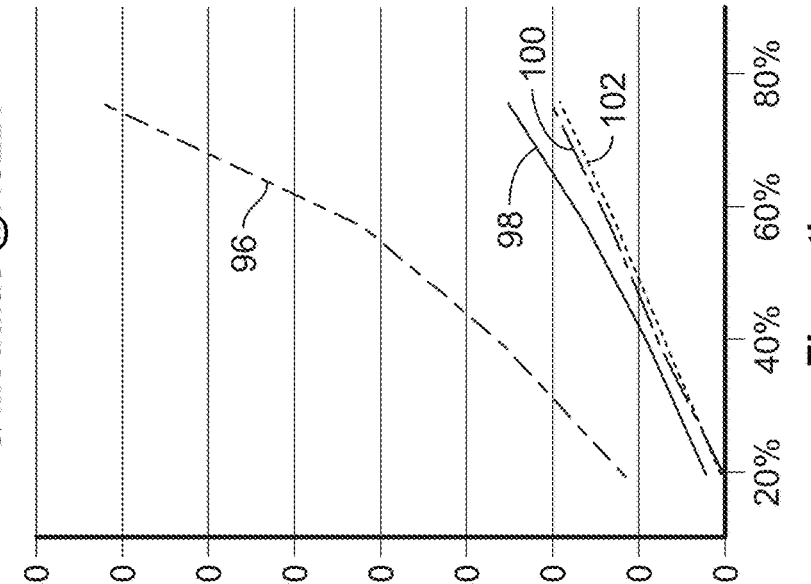
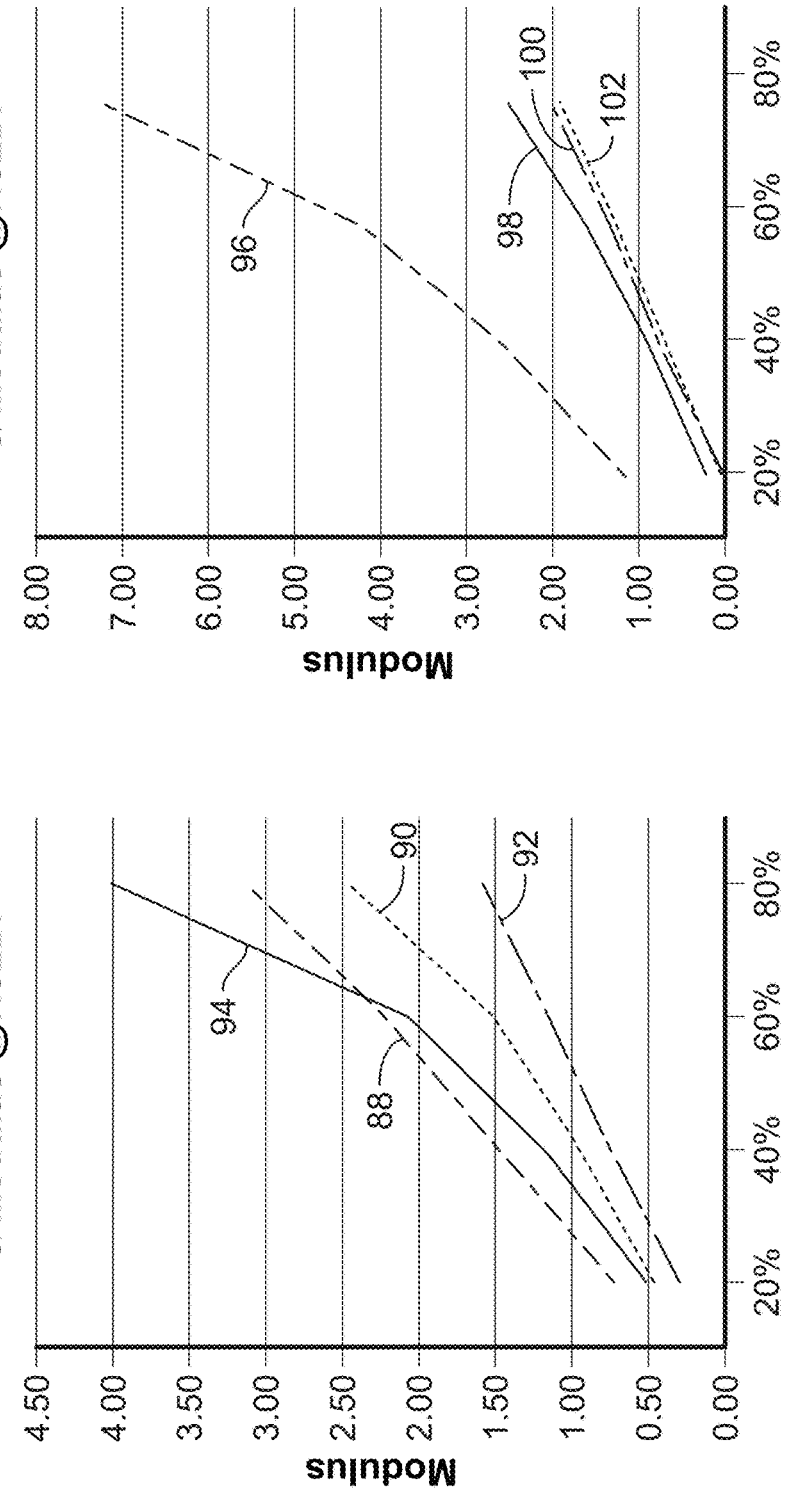
FIG. 4A
FIG. 4B

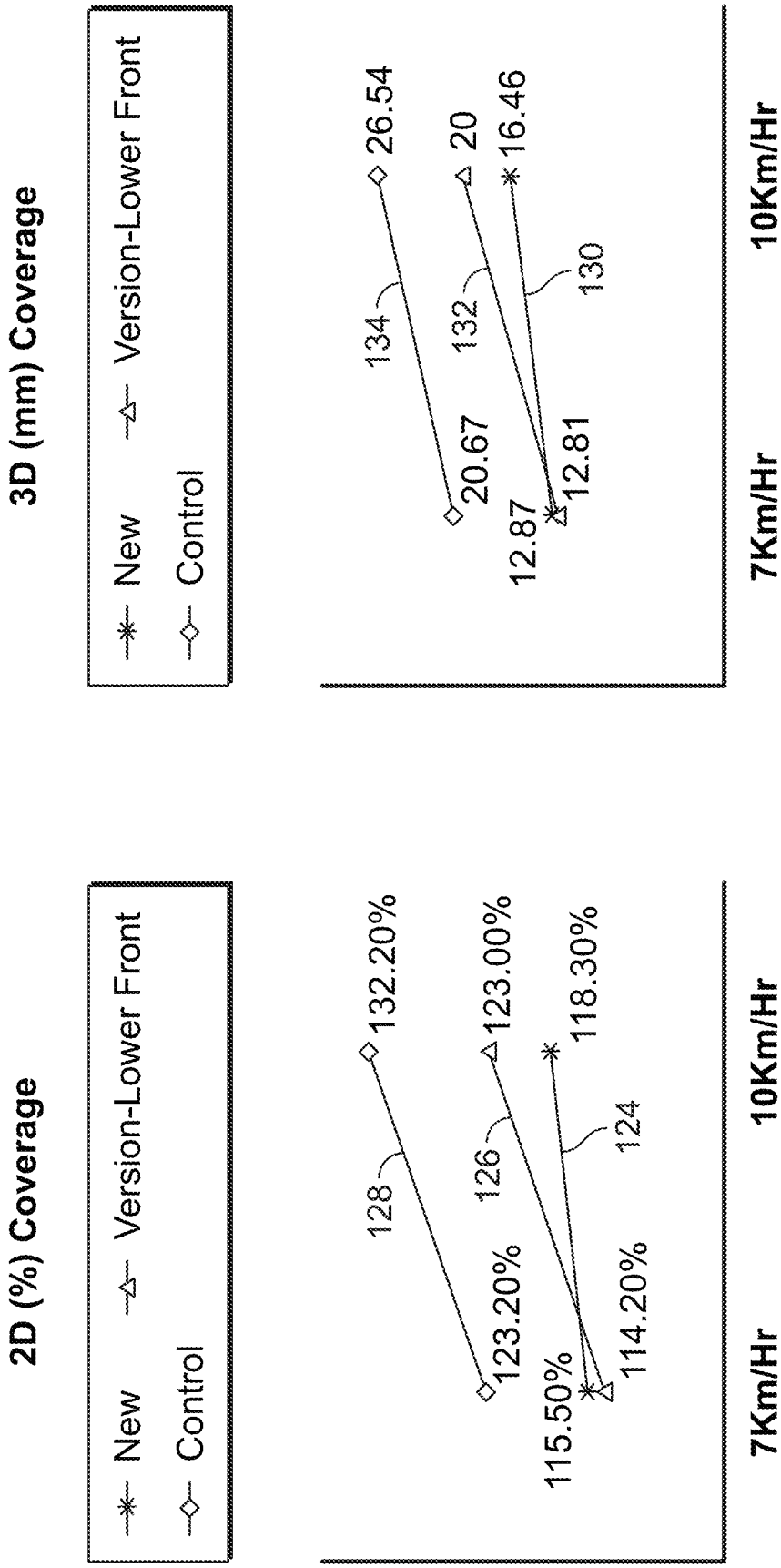

ATHLETIC BRA

CROSS REFERENCE TO RELATED APPLICATIONS

This application claims priority to U.S. Provisional Patent Application No. 63/191,082, filed on May 20, 2021, entitled "Athletic Bra," the contents of which is incorporated by reference herein in its entirety and is to be considered a part of this application.

REFERENCE REGARDING FEDERALLY SPONSORED RESEARCH OR DEVELOPMENT

Not applicable

SEQUENCE LISTING

Not applicable

BACKGROUND

1. Field of the Invention

The present disclosure relates generally to an athletic bra constructed to provide support for high impact performance.

2. Description of the Background

Many conventional athletic bras, or sports bras, generally comprise a material that covers and supports a wearer's breasts during, for example, athletic activities. In particular, athletic bras are generally configured to support the breasts to help protect breast tissue from damage and/or stretching during motion. High impact athletic bras are often used for high impact or high intensity activities, such as those that may result in excessive bouncing, potentially resulting in subsequent damage and/or stretching of breast tissue and/or pain. Such issues can be exacerbated for subjects with larger breasts.

In order to provide suitable support, high impact sports bra in the market usually include an underwire made of metal or hard plastic to support the breasts, inflexible or rigid molded cups to encapsulate and hold the breasts in place, thus helping restrict movement, and/or compression to press the breasts toward the body and further restrict movement. However, current high impact bras are often not comfortable and/or are not constructed with a focus on reducing breast momentum.

Therefore, athletic bras for high impact performance having features capable of reducing breast momentum without sacrificing comfort may be desired.

SUMMARY

An athletic bra, as described herein, may have various configurations. In some embodiments, an athletic bra is provided comprising a front panel, a rear panel, a first strap and a second strap connecting the front panel to the rear panel, and an underband coupled to the front panel and the rear panel. The front panel, the rear panel, the first strap, the second strap, and the underband comprise an outer shell, and the outer shell includes a fabric comprising polyamide and spandex. The athletic bra also includes a first cup and a second cup positioned within the front panel, where the first cup and the second cup each comprise a first layer and a second layer coupled together by an adhesive.

In some embodiments, the first layer is a foam material and the second layer is a double knit fabric. Furthermore, in some embodiments, the adhesive is polyurethane hot melt. In some embodiments, the fabric comprises between about 60-65% polyamide and between about 35-40% spandex. In further embodiments, the fabric comprises 63% polyamide and 37% spandex.

In some embodiments, the front panel, the rear panel, the first strap, the second strap, and the underband comprise the outer shell and an inner layer, and the first cup and the second cup are coupled to one of the outer shell and the inner layer. Furthermore, the first cup and the second cup may each be configured to extend upward from the underband toward a neck opening defined by the front panel. Additionally, in some embodiments, the outer shell and the inner layer are coupled together to form a seamless edge.

In some embodiments, the front panel is sized to fully cover breasts of a wearer. In further embodiments, the front panel defines a central axis, and a total height of the front panel and the underband along the central axis of about 18 centimeters. In some embodiments, the underband includes a height of about 3.8 centimeters. In some embodiments, the first strap and the second strap each includes a uniform width along its length, wherein the width is about 3.5 centimeters. In other embodiments, the first strap and the second strap each includes a varying width along its length. In some embodiments, the first strap and the second strap each include an adjustable length. In some embodiments, the underband includes an adjustable circumference.

Some embodiments provide an athletic bra comprising an outer shell, an inner layer, a first cup, and a second cup. The outer shell is configured to lay distal from a wearer when the athletic bra is worn, and the inner layer is configured to lay more proximal to the wearer than the outer shell when the athletic bra is worn. At least one of the outer shell and the inner layer includes a fabric comprising polyamide and spandex. The first cup and the second cup are positioned between the outer shell and the inner layer, and each comprise a first layer and a second layer coupled together by an adhesive.

In some embodiments, the first layer is a foam material and the second layer is a double knit fabric. Furthermore, in some embodiments, the adhesive is polyurethane hot melt. In some embodiments, the fabric comprises between about 60-65% polyamide and between about 35-40% spandex. In further embodiments, the fabric comprises 63% polyamide and 37% spandex.

In some embodiments, the outer shell and the inner layer are coupled together to form a front panel, a rear panel, a first strap and a second strap connecting the front panel to the rear panel, and an underband coupled to the front panel and the rear panel. In some embodiments, the front panel, the rear panel, the first strap, and the second strap comprise an outer edge that defines a neck opening, and the outer shell and the inner layer are bonded together at the outer edge.

Other aspects of the athletic bra described herein, including features and advantages thereof, will become apparent to one of ordinary skill in the art upon examination of the figures and detailed description herein. Therefore, all such aspects of the athletic bras are intended to be included in the detailed description and this summary.

BRIEF DESCRIPTION OF THE DRAWINGS

FIG. 4A is a chart of results from a study of vertical grain elongation and modulus at 7.5 pound-force, comparing a first outer shell fabric type, a second outer shell fabric type, a third outer shell fabric type, and a fourth outer shell fabric type;

FIG. 4B is a chart of results from a study of horizontal grain elongation and modulus at 7.5 pound-force, comparing a first outer shell fabric type, a second outer shell fabric type, a third outer shell fabric type, and a fourth outer shell fabric type;

FIG. 6A is a chart of results from a study of breast movement (vertical nipple displacement) during running, comparing the athletic bra of FIG. 1 having an 18-centimeter front panel height, an athletic bra having a 16-centimeter front panel height, and a control bra;

FIG. 6B is a chart of results from a study of breast movement (lateral nipple displacement) during running, comparing the athletic bra of FIG. 1 having an 18-centimeter front panel height, an athletic bra having a 16-centimeter front panel height, and a control bra;

DETAILED DESCRIPTION OF THE DRAWINGS

The following discussion and accompanying figures disclose various embodiments or configurations of an athletic bra. Although embodiments are disclosed with reference to an athletic bra for high impact activities, such as running, intensive training, elliptical, dancing, mounting biking, jumping, etc., concepts associated with the embodiments of the athletic bra may be applied to a wide range of bra and bra styles, including mid-intensity activities such as cycling and skiing, low-intensity activities such as walking, yoga, and strength training, or loungewear, for example. Accordingly, concepts described herein may be utilized in a variety of products.

The term "about," as used herein, refers to variation in the numerical quantity that may occur, for example, through typical measuring and manufacturing procedures used for athletic bras or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

Figure 1:
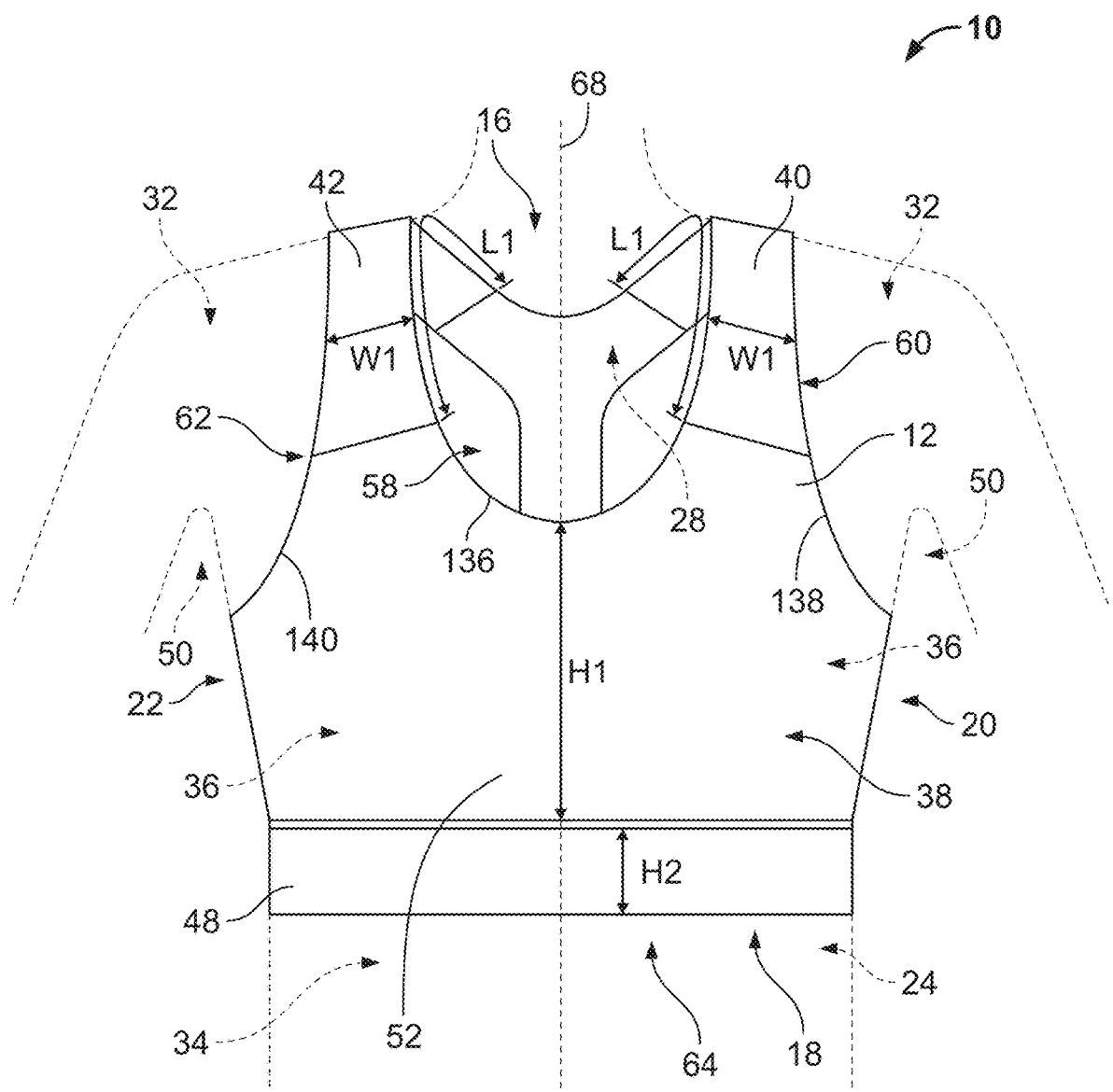
FIG. 1 is a front view of an athletic bra according to some embodiments.
Figure 2:
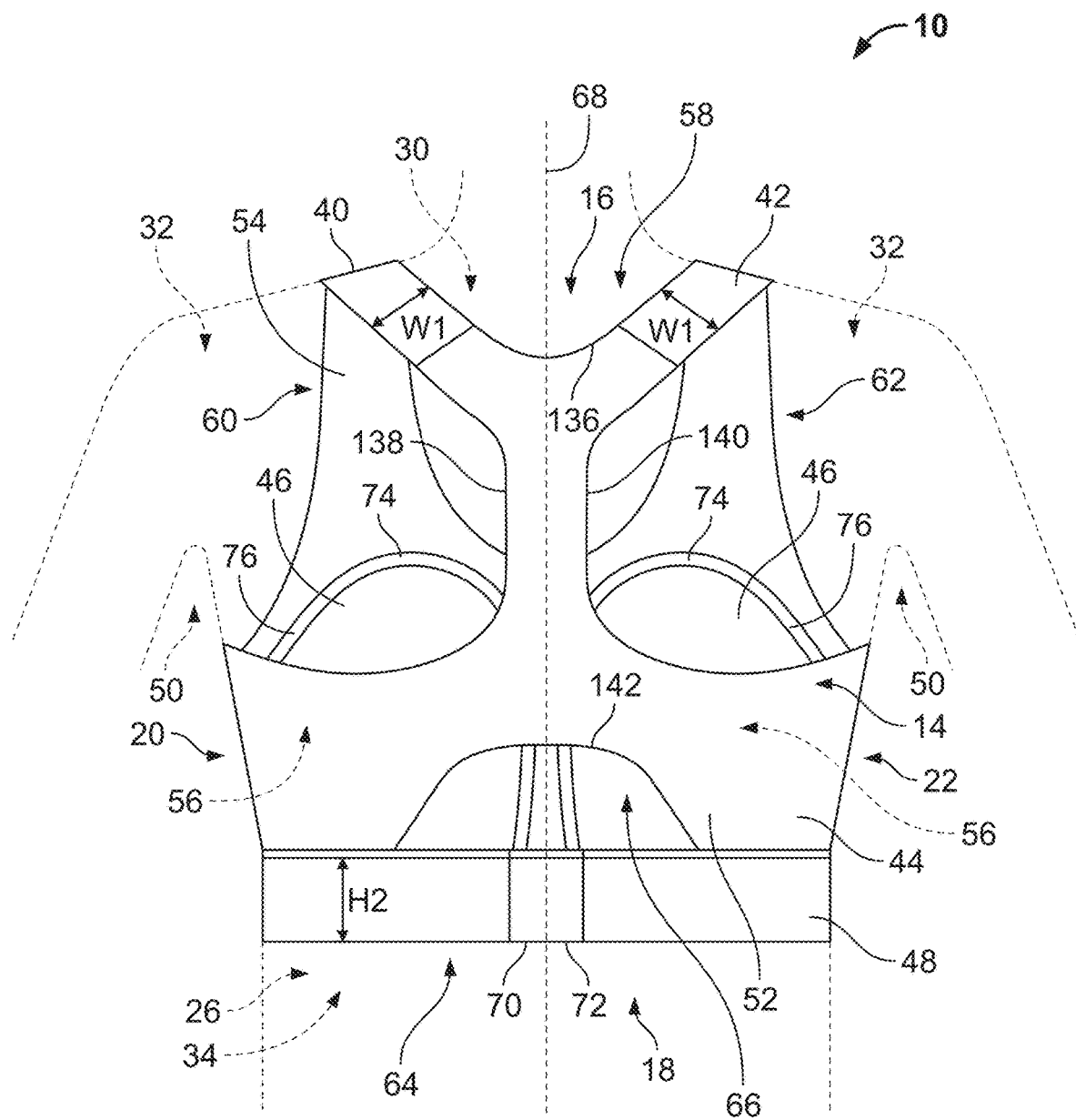
FIG. 2 is a rear view of the athletic bra of FIG. 1.

The present disclosure is directed to an athletic bra and/or specific components of the athletic bra. For example, FIGS. 1 and 2 depict an athletic bra 10 according to some embodiments. As described in further detail below, in some embodiments, the athletic bra 10 can include one or more features that, alone or in combination, minimizes breast movement and momentum during high intensity movements, such as running, jumping, dancing, elliptical, mountain biking, or other high intensity training.

Referring to FIGS. 1 and 2, generally, the athletic bra 10 can include a front 12 (shown in FIG. 1), a rear 14 (shown in FIG. 2), a top 16, a bottom 18, a first side 20, and a second side 22. When worn, the front 12 can coincide with a wearer's front torso 24, the rear 14 can coincide with the wearer's rear torso 26, the top 16 can coincide with the wearer's chest 28, back 30, and shoulders 32, and the bottom 18 can coincide with the wearer's mid-torso 34, such as the rib cage below the breasts 36, the first side 20 can coincide with a first lateral side of the wearer, such as the wearer's left side, and the second side can coincide with a second, opposite lateral side of the wearer, such as wearer's right side. However, in some embodiments, the first side 20 and the second side 22 may instead coincide with the wearer's right side and left side, respectively.

Still referring to FIGS. 1 and 2, the athletic bra 10 can include a front panel 38 (shown in FIG. 1), two straps 40, 42, a rear panel 44 (shown in FIG. 2), two cups 46 (shown in FIG. 2), and an underband 48. The front panel 38 is configured to overlay a portion of the front torso 24 of the wearer, covering the breasts 36 and a portion of the chest 28. The rear panel 44 is configured to overlay a portion of the rear torso 26 of the wearer, and may be coupled to the front panel 38 directly and via the straps 40, 42 and the underband 48. For example, the straps 40, 42 may be coupled to the front panel 38 and extend over the shoulders 32 of the wearer to the rear panel 44, thus connecting the front panel 38 to the rear panel 44. The underband 48 is configured to extend around the wearer's mid-torso 34, underneath the breasts 36, and be coupled to bottom portions of the front panel 38 and the rear panel 44. Additionally, in some embodiments, the front panel 38 and the rear panel 44 may comprise one contiguous piece, or may be separate pieces coupled. e.g., stitched or bonded, together along the first and second sides 20, 22, or may be a composition of multiple layers, some being continuous and some being coupled together. Furthermore, in some embodiments, the front panel 38 and the rear panel 44 may be indirectly coupled together via separate side panels (not shown) that are configured to overlay portions of the side torso of the wearer, e.g., under the armpits 50. Additionally, in some embodiments, the front panel 38 and/or the rear panel 44, and/or the straps 40, 42 may comprise one contiguous piece, or may be separate pieces coupled, e.g., stitched or bonded, together, or may be a composition of multiple layers, some being continuous and some being coupled together.

In some embodiments, referring to FIGS. 1 and 2, the athletic bra 10 can comprise one or more layers, including at least an outer shell 52. The outer shell 52 may be a layer of fabric most distal from the wearer when the athletic bra 10 is worn. Further, in some embodiments, the athletic bra 10 can comprise the outer shell 52 and an inner layer, such as an inner shell 54 (shown in FIG. 2) configured to be the most proximate layer to the wearer, e.g., contacting the wearer, when the athletic bra 10 is worn. In other words, when the athletic bra 10 is worn, the outer shell 52 is configured to face away from the wearer and the inner shell 54 is configured to face toward the wearer. Furthermore, in some embodiments, the athletic bra 10 can comprise the outer shell 52 and multiple inner layers, such as the inner shell 54 and one or more mid-layers (not shown) located between the outer shell 52 and the inner shell 54. As such, in some embodiments, the outer shell 52 and the inner shell 54 may be collectively considered an "outer shell" as these layers make up the outer layers of the athletic bra 10, in contrast to the inner layers therebetween.

Each layer, i.e., the outer shell 52, the inner shell 54, and any mid-layers, can comprise the same fabric type, or varying fabric types. For example, in some embodiments, one or more layers can have different properties from other layers. Additionally, the front panel 38, the underband 48, and/or other components can include additional components coupled to or arranged between one of the layers. For example, as shown in FIG. 2, the cups 46 can be coupled to the inner shell 54, or an innermost layer, of the front panel 38, or coupled in between layers of the front panel 38. In some embodiments, the cups 46 can be coupled to the inner shell 54, and/or a mid-layer, and/or the outer shell 52 of the front panel 38. Generally, each cup 46 can be positioned along the front panel 38 over a nipple area 56 (shown in FIG. 2) and its periphery. As further described below, in some embodiments, each cup 46 can extend upward from the underband 48. Additionally, in some embodiments, the underband 48 can incorporate one or more elastic bands therein (not shown) so that the underband 48 compresses around the mid-torso 34 to help secure the athletic bra 10 in place and support the breasts 36.

Referring still to FIGS. 1 and 2, the front panel 38, the rear panel 44, the straps 40, 42, and the underband 48 can be formed together to define a neck opening 58 at the top 16, a first arm opening 60 along the first side 20, a second arm opening 62 along the second side 22, a torso opening 64 at the bottom 18, and, optionally, a rear opening 66 (shown in FIG. 2) at the rear 14 between the rear panel 44 and the underband 48. The relative arrangement and size of these components can define different styles and support types of the athletic bra 10.

For example, as noted above and referring to FIG. 1, generally, the front panel 38 can extend upward from the underband 48 to the neck opening 58 to cover the breasts 36 and chest 28 of the wearer. The front panel 38 can extend a minimal height H1 at its center (aligned with a central axis 68) that defines a coverage type of the athletic bra 10. More specifically, in some applications, a height H1 that is well below armpit level and/or does not fully cover the breasts 36 when worn may be considered a low-coverage or low-cut athletic bra. A height H1 that is generally aligned with or rises above the armpits 50 and fully covers the breasts 36 when worn may be considered a full-coverage or high-cut athletic bra. And a height H1 higher than a low-cut, but still not fully covering the breasts 36 when worn may be considered a mid-cut athletic bra. A full-coverage athletic bra 10 can provide more support than a low-coverage or mid-cut athletic bra as fuller coverage of the breasts can reduce movement and, as a result, restrict bounce.

Referring to FIG. 2, generally, the rear panel 44 can extend upward from the underband 48 to the neck opening 58. In the embodiment illustrated in FIG. 2, the rear panel 44 forms a "T-shape" before joining the straps 40, 42 to define a racer-back style athletic bra 10. In such a style, the rear panel 44 and the straps 40, 42 generally do not cover the wearer's shoulder blades. In some embodiments, the rear panel 44 may instead from a generally rectangular shape, in which the straps 40, 42 extend downward and cross over each other before joining the rear panel 44, thus defining a crisscross style athletic bra. In yet other embodiments, the rear panel 44 may form the generally rectangular shape, in which the straps 40, 42 extend straight downward from the shoulders 32 to join the rear panel 44, thus defining a tank-top style athletic bra. In yet other embodiments, the athletic bra 10 may not include a rear panel and the straps 40, 42 can extend down (in a crisscross style or tank-top style) to join the underband 48. Additionally, the rear panel 44, in a T-shape or rectangular shape, can include a constant bottom section that is coupled to the underband 48, or can include an interrupted bottom section coupled to the underband 48, as shown in FIG. 2. The interrupted bottom section can, with the underband 48, define the rear opening 66, as shown in FIG. 2.

Referring still to FIG. 2, generally, the underband 48 can extend circumferentially around the wearer's torso 34 and be coupled to the front panel 38 and the rear panel 44. As noted above, in some embodiments, the underband 48 can further incorporate one or more elastic bands extending therethrough, or include fabrics with sufficiently elasticity, to help tension the underband 48 around the wearer's torso 34. Furthermore, in some embodiments, the underband 48 may continuously extend an entire circumference of the athletic bra 10. As a result, in such embodiments, the underband 48 can have a constant or non-adjustable circumference. However, in other embodiments, the underband 48 may discontinuously extend the entire circumference. More specifically, as shown in FIG. 2, rear ends 70, 72 of the underband 48 can be coupled together by, for example, a hook and eye closure (not shown). For example, a first rear end 70 of the underband 48 can include one hook or a set of hooks, while a second rear end 72 of the underband 48 can include one eye or a set of eyes configured to receive the hooks. Furthermore, in some embodiments, the underband 48 can have an adjustable circumference by incorporating a plurality of eyes (or sets of eyes) at different locations distanced from an edge of the rear end 72, thus providing different locations to receive the hooks. In this manner, the underband 48 may be adjustable in that a wearer can further tighten the underband 48 around their torso 34 by adjusting the hook and eye closure.

Referring again to FIGS. 1 and 2, each strap 40, 42 can extend from the front panel 38 along the front 12, to the rear panel 44 along the rear 14. In some embodiments, as shown in FIGS. 1 and 2, the straps 40, 42 can have a generally uniform or constant width W1 along their full length. However, in other embodiments, the straps 40, 42 may have a varying width W1 along their lengths. Additionally, in some embodiments, as shown in FIGS. 1 and 2, the straps 40, 42 can have a constant length L1. However, in other embodiments, the straps 40, 42 can have a variable or adjustable length L1, for example, by incorporating adjustment slides (not shown).

As noted above, the athletic bra 10 of some embodiments can incorporate one or more features that, alone or in combination, improve support of the wearer's breasts 36 during use, for example, in high intensity or high impact activities. The features may enhance support by reducing breast movement and momentum during activities. Reduction in breast movement can be quantitatively analyzed by monitoring nipple movement during activity, for example, as vertical displacement (or y-axis displacement) from original nipple position to clavicle in a percentage, where original nipple position is designated as 100% (considered two-dimensional displacement metrics or "2D metrics"). Reduction in breast movement can further be quantitatively analyzed by monitoring nipple movement during activity, for example, as "lateral displacement" or a sum of displacements, e.g., along x, y, and z axes, between original nipple position and clavicle (considered three-dimensional displacement metrics or "3D metrics"). The features of some embodiments are discussed below with respect to these quantitative assessments.

Referring to FIG. 2, in some embodiments, each cup 46 can be "built in" to the front panel 38, e.g., directly coupled to the inner shell 54 or to a mid-layer of the front panel 38. For example, a built-in cup 46 of some embodiments may be in contrast to removable cups that can be inserted and removed in between layers or permanent "floating" cups that are not directly coupled to a particular layer but, rather, are positioned between layers yet still movable. As shown in FIG. 2, each cup 46 can extend upward from the underband 48 to a location adjacent but spaced apart from the neck opening 58, with a curved or semi-circular top end 74, in order to separately encapsulate a respective breast 36. Each cup 46 can further extend from a location adjacent the central axis 68 along the front panel 38 to a location adjacent the respective side 20, 22. For example, an outer perimeter 76 of the cup 46 can extend from the underband 48 adjacent the central axis 68 generally vertically upward, then start to curve until reaching the curved top end 74, then generally follow a curve of the side opening 60, 62, before extending straight vertically downward back to the underband 48 adjacent the respective side 20, 22.

Figure 8:
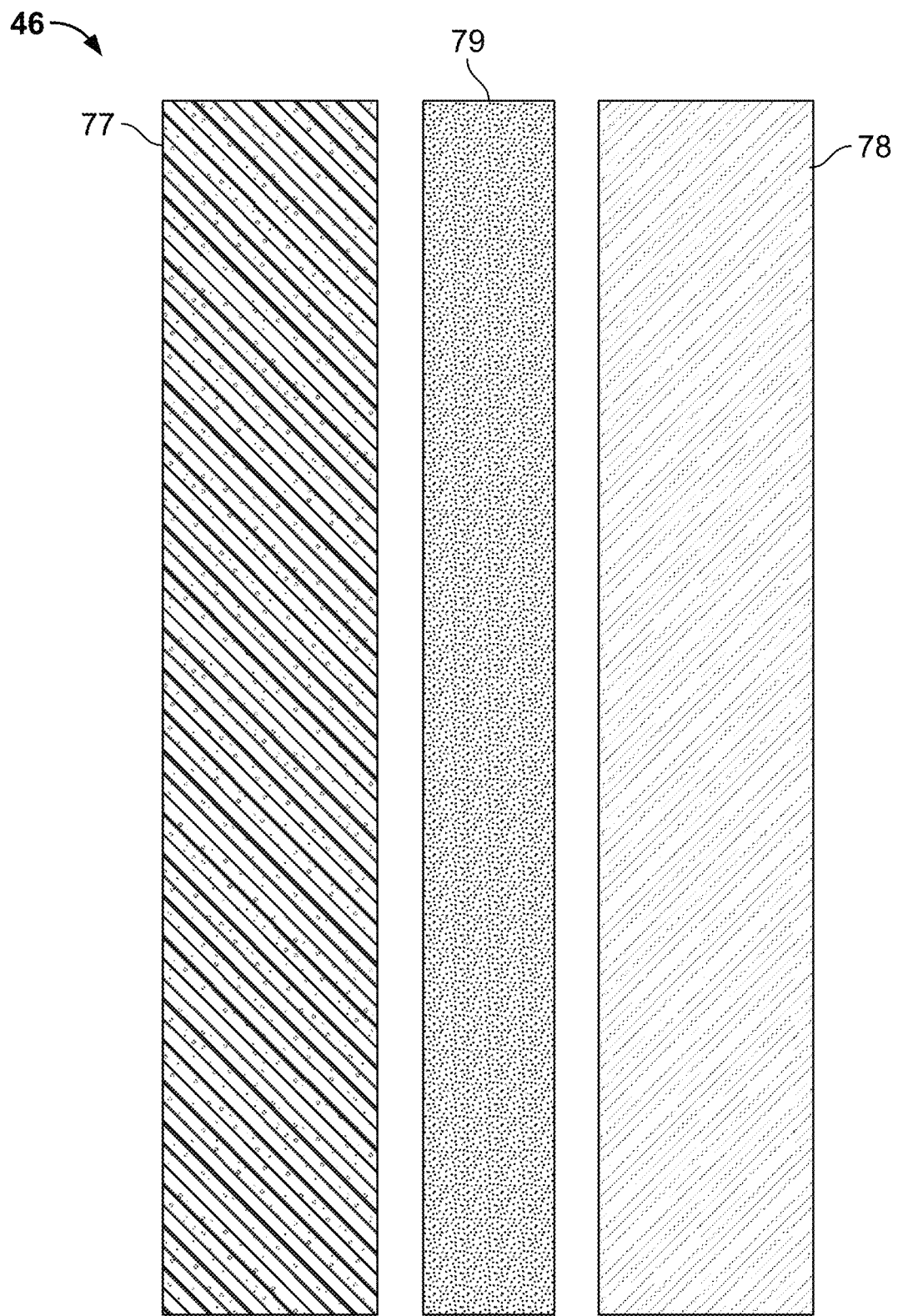
FIG. 8 is a cross sectional view of a cup of the athletic bra of FIG. 1.

Still referring to FIG. 2, each cup 46 can include two layers of fabric configured to directly overlay the nipple area 56 and its periphery, such as a first layer 77 and a second layer 78 (see FIG. 8). In some embodiments, the first layer can be a foam material and the second layer can be a double knit fabric. In other embodiments, the first layer can be a double knit fabric and the second layer can be a foam material. For example, the foam material can be a polyurethane foam material. As another example, the foam material can be a combination of spacer foam (such as spacer foam comprised of polyester and elastane) and a double knit fabric (such as knit fabric comprised of polyester and elastane, or spandex). As a specific example, the foam material can be a combination of spacer foam, comprised of 46% 75 denier ("D") polyester, 44% 60D polyester, and 10% 40D elastane, and double knit fabric, comprised of 85% polyester and 16% spandex. Furthermore, the first layer and the second layer can be coupled or fixed together with a medium in a specific pattern. For example, in some embodiments, the first layer 77 and the second layer 78 can be coupled together using an adhesive 79 such as polyurethane hot melt ("PUR"), also called reactive hot melt, reactive polyurethane, polyurethane reactive, or RPU adhesive). In contrast to inflexible molded cups that encapsulate the breasts 36, the present cup materials (comprising foam and double knit fabric) can provide a soft, flexible mold cup.

Figure 3A:
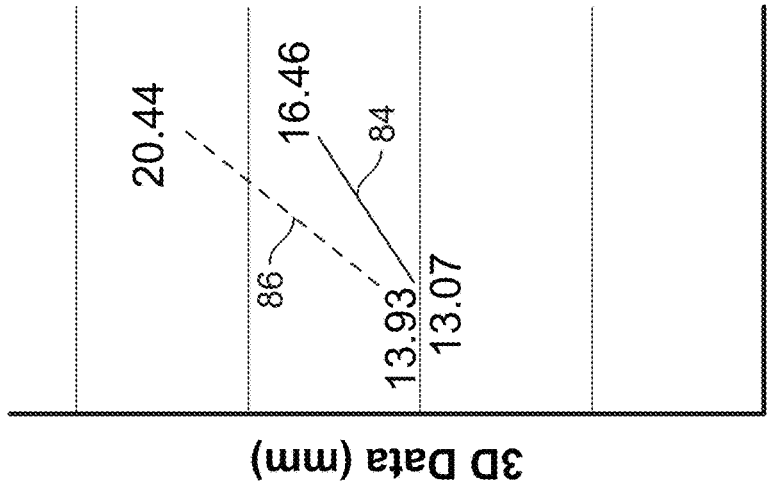
FIG. 3A is a chart of results from a study of breast movement (vertical nipple displacement) during running, comparing the athletic bra of FIG. 1 having a two-layer breast cup and a control bra.

The construction of the cup 46 and pattern of the coupling can help absorb the energy of breast bounces and reduce momentum during activity. For example, referring to FIGS. 3A and 3B, a study was conducted of a wearer (size 34D) wearing the athletic bra 10 with the cup 46 described above, i.e., with the two-layer, foam and double knit fabric composition coupled together with PUR, and an existing athletic bra providing a control cup, while running at 7 kilometers per hour (km/hr) and 10 km/hr. FIG. 3A illustrates resulting 2D metrics measured from the cup 46 described above (line 80) and the control cup (line 82). As shown in FIG. 3A, the wearer experienced a 115.5% displacement and a 118.3% displacement with the cup 46 described above when running at 7 km/hr and 10 km/hr, respectively, and the wearer experienced a 116% displacement and a 123.6% displacement with the control cup when running at 7 km/hr and 10 km/hr.

Figure 3B:
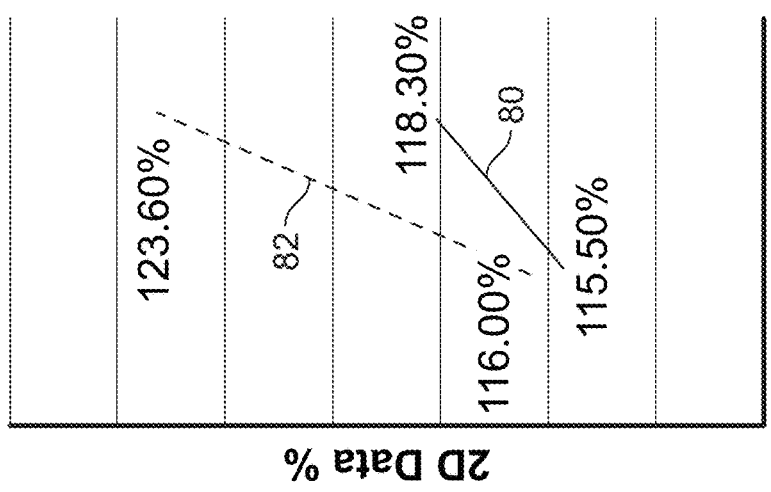
FIG. 3B is a chart of results from a study of breast movement (lateral nipple displacement) during running, comparing the athletic bra of FIG. 1 having a two-layer breast cup and a control bra.

Furthermore, FIG. 3B illustrates resulting 3D metrics measured from the cup 46 described above (line 84) and the control cup (line 86). As shown in FIG. 3B, the wearer experienced a 13.07 millimeter (mm) displacement and a 16.46 mm displacement with the cup 46 described above when running at 7 km/hr and 10 km/hr, respectively, and the wearer experienced a 13.93 mm displacement and a 20.44 mm displacement with the control cup when running at 7 km/hr and 10 km/hr. In particular, specific 3D metrics show that the cup 46 described above can reduce breast displacement while the wearer runs at 10 km/hr by 5% in the vertical (y-axis or up-and-down) direction and by 19% in the lateral (x-axis or side-to-side) direction. As shown in the results of FIGS. 3A and 3B, the construction of the cup 46 and pattern of the coupling of the athletic bra 10, according to some embodiments, can reduce breast movement during activity compared to other cups.

Referring back to FIGS. 1 and 2, as noted above, the athletic bra 10 can comprise one or more layers, including at least an outer shell 52. In some embodiments, the outer shell 52 can comprise a fabric made of a combination of polyamide and spandex, such as between about 60-65% polyamide and between about 35-40% spandex. In some embodiments, the outer shell 52 can be made of a fabric comprising 63% polyamide and 37% spandex, with a weight of about 345 grams per square meter (g/m2). This combination, with a suitable percentage of spandex, provides sufficient support and comfort. It should be noted that spandex may also be referred to as elastane, elastic synthetic fiber, polyether-polyurea copolymer, etc. In some embodiments, the spandex may be Lycra®.

Furthermore, this combination of polyamide and spandex of some embodiments provides a soft, comfortable four-way stretch. For example, FIGS. 4A and 4B illustrate a comparison of vertical grain elongation and modulus at 7.5 pound-force (lbf) and horizontal grain elongation and modulus at 7.5 lbf, respectively, between the present shell fabric described above (63% polyamide and 37% spandex) and three other types of fabric ("fabric A," "fabric B," and "fabric C"). Fabric A was comprised of 76% polyester and 24% spandex, weighing 290 g/m2, Fabric B was comprised of 77% polyester and 23% spandex, weighing 250 g/m2, and Fabric C was comprised of 75% polyester and 25% spandex, weighing 225 g/m2. As shown in FIG. 4A, the present fabric (represented at line 88) illustrated a higher vertical grain modulus than fabrics B and C (line 90 and 92, respectively) from 20%-80% elongation, and a higher vertical grain modulus than fabric A (line 94) from 20%-60%. Furthermore, as shown in FIG. 4B, the present fabric (represented at line 96) illustrated a higher horizontal grain modulus than all of fabrics A, B, and C (line 98, 100, and 102, respectively) from 20%-80% elongation.

Figures 5A, 5B:
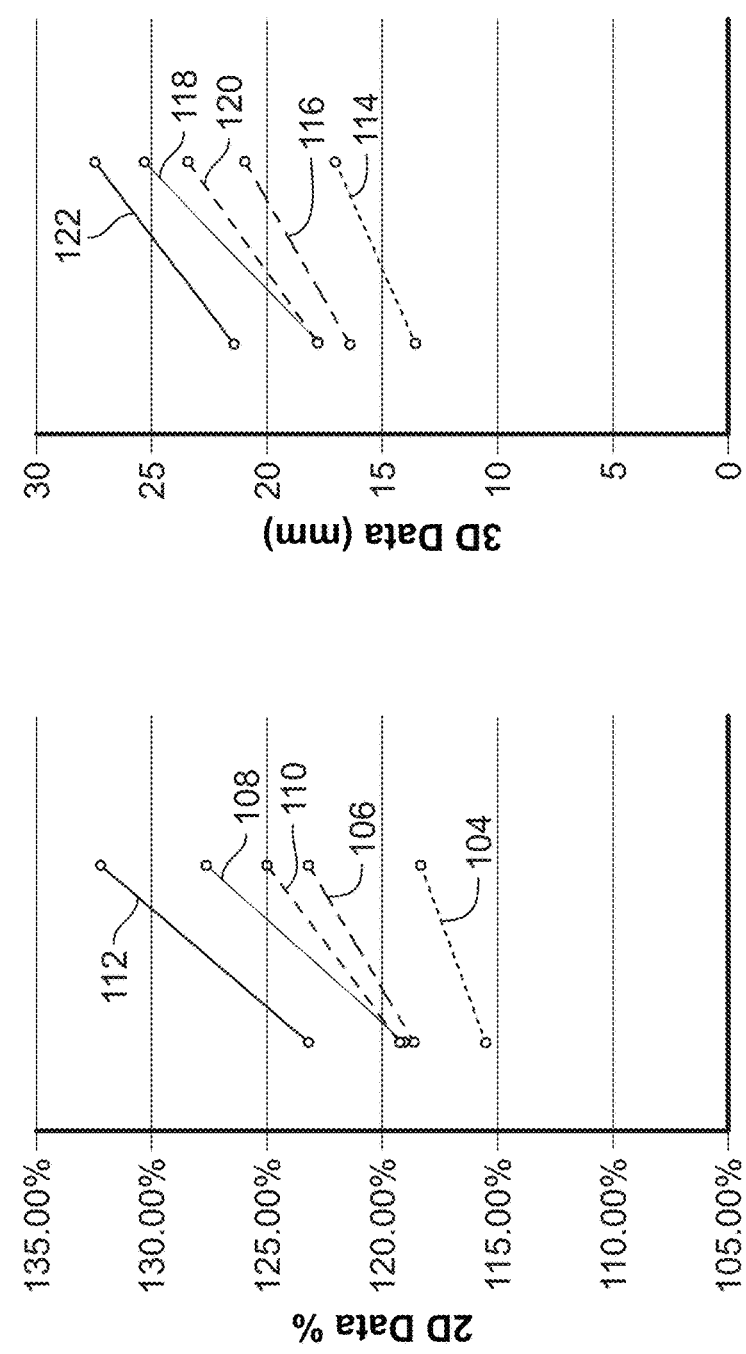
FIG. 5A is a chart of results from a study of breast movement (vertical nipple displacement) during running, comparing the athletic bra of FIG. 1 having a first outer shell fabric type, an athletic bra having a second outer shell fabric type, an athletic bra having a third outer shell fabric type, an athletic bra having a fourth outer shell fabric type, and a control bra.
FIG. 5B is a chart of results from a study of breast movement (lateral nipple displacement) during running, comparing the athletic bra of FIG. 1 having a first outer shell fabric type, an athletic bra having a second outer shell fabric type, an athletic bra having a third outer shell fabric type, an athletic bra having a fourth outer shell fabric type, and a control bra.

The higher modulus of the present outer shell fabric can provide better support to reduce breast bouncing during activity. For example, referring to FIGS. 5A and 5B, a study was conducted of a wearer (size 34D) wearing the athletic bra 10 with the outer shell fabric described above (63% polyamide and 37% spandex), an athletic bra comprising fabric A, an athletic bra comprising fabric B, an athletic bra comprising fabric C, and an existing athletic bra providing a control fabric, while running at 7 km/hr and 10 km/hr. FIG. 5A illustrates resulting 2D metrics measured from the bras having the present outer shell fabric (line 104), fabric A (line 106), fabric B (line 108), fabric C (line 110), and the control fabric (line 112). As shown in FIG. 5A, at 7 km/hr, the wearer experienced a 115.5% displacement with the present shell fabric described above, a 118.6% displacement with fabric A, a 119.00% displacement with fabric B, a 119.2% displacement with fabric C, and a 123.2% displacement with the control fabric. At 10 km/hr, the wearer experienced a 118.3% displacement with the present shell fabric, a 123.2% displacement with fabric A, a 127.6% displacement with fabric B, a 125% displacement with fabric C, and a 132.2% displacement with the control fabric.

Furthermore, FIG. 5B illustrates resulting 3D metrics measured from the bras having the present outer shell fabric (line 114), fabric A (line 116), fabric B (line 118), fabric C (line 120), and the control fabric (line 122). As shown in FIG. 5B, at 7 km/hr, the wearer experienced a 13.07 mm displacement with the present shell fabric described above, a 15.83 mm displacement with fabric A, a 17.23 mm displacement with fabric B, a 17.19 mm displacement with fabric C, and a 20.67 mm displacement with the control fabric. At 10 km/hr, the wearer experienced a 16.46 mm displacement with the present shell fabric, a 20.23 mm displacement with fabric A, a 24.48 mm displacement with fabric B, a 22.62 mm displacement with fabric C, and a 26.54 mm displacement with the control fabric. As shown in the results of FIGS. 5A and 5B, the composition of the outer shell fabric, according to some embodiments, can reduce breast movement, i.e., reduce lateral and vertical displacement, during activity compared to other fabrics. In light of these results, the outer shell fabric of some embodiments can be suitable for high-impact activities. Furthermore, in some applications, fabric A may also be suitable for high-impact activities, though it exhibits larger lateral and vertical breast displacement than the present shell fabric.

Referring back to FIG. 1, in some embodiments, the height H1 of the front panel 38 (shown in FIG. 1) can coincide with a full-coverage configuration. For example, in some embodiments, for a size small, the "total height" of the athletic bra 10, including the height H1 of the front panel 38 plus a height H2 of the underband 48 (shown in FIGS. 1 and 2), measured along the central axis 68, can be at least about 18 centimeters (cm) to provide full-coverage for high impact activities. In contrast, a size small mid-impact activity athletic bra can include a total height of at least about 15 cm. Generally, different-size athletic bras 10, e.g., small, medium, large, extra-large, etc., can include at least a different height H1 so that the total height provides full-coverage for different-sized breasts. As noted above, a full-coverage athletic bra 10 can provide more support than a mid- or low-coverage athletic bra as fuller coverage of the breasts can reduce movement and, as a result, restrict bounce.

By way of example, referring to FIGS. 6A and 6B, a study was conducted of a wearer (size 34D) wearing the athletic bra 10 of some embodiments with a front panel 38 having a height of 18 cm, the athletic bra with a front panel having a height of 16 cm, and an existing athletic bra providing a control bra, while running at 7 km/hr and 10 km/hr. FIG. 6A illustrates resulting 2D metrics measured from the bras having a height H1 of 18 cm (line 124), height H1 of 16 cm (line 126), and the control bra (line 128). As shown in FIG. 6A, at 7 km/hr, the wearer experienced a 115.5% displacement with the 18-cm front panel bra, a 114.2% displacement with the 16-cm front panel bra, and a 123.2% displacement with the control bra. At 10 km/hr, the wearer experienced a 118.3% displacement with the 18-cm front panel bra, a 123% displacement with the 16-cm front panel bra, and a 132.2% displacement with the control bra.

Furthermore, FIG. 6B illustrates resulting 3D metrics measured from the bras having a height H1 of 18 cm (line 130), height H1 of 16 cm (line 132), and the control bra (line 134). As shown in FIG. 6B, at 7 km/hr, the wearer experienced a 13.07 mm displacement with the 18-cm front panel bra, a 12.81 mm displacement with the 16-cm front panel bra, and a 20.67 mm displacement with the control bra. At 10 km/hr, the wearer experienced a 16.46 mm displacement with the 18-cm front panel bra, a 20 mm displacement with the 16-cm front panel bra, and a 26.54 mm displacement with the control bra. As shown in the results of FIGS. 6A and 6B, while the present bra with full coverage is similar to an equivalent mid-coverage bra for certain activities, the present bra with full coverage provides significantly more breast control, i.e., reducing lateral and vertical displacement, during higher intensity activities.

Referring back to FIG. 1, as noted above, the athletic bra 10 can comprise multiple layers of fabric, including at least the outer shell 52. Further, the layers can be coupled together along one or more edges. In some embodiments, the layers of the athletic bra 10 can be bonded together at an outer edge 136 (shown in FIGS. 1 and 2) defining the neck opening 58, an outer edge 138 (shown in FIGS. 1 and 2) defining the first arm opening 60, an outer edge 140 (shown in FIGS. 1 and 2) defining the second arm opening 62, and/or an outer edge 142 (shown in FIG. 2) defining the rear opening 66. In some embodiments, an entire outer edge 136, 138, 140, 142 of each opening 58, 60, 62, 66 is bonded. In other embodiments, a portion of the outer edge 136, 138, 140, 142 of each opening 58, 60, 62, 66 is bonded. These bonded, or seamless, edges 136, 138, 140, and/or 142 can provide necessary strength to hold the layers together while also adding less bulk and providing smooth edges to minimize chafing during movement, for example, as opposed to edges formed by cutting and sewing together layers. That is, a cut-and-sewn edge may comprise one layer folding over the other layers, or a further, separate layer folded over the outer edge of all existing layers, i.e., extending outside the outer shell 52 and inside the inner shell 54, thus adding one or two further layers at the outer edge, and the folded over portion is sewn to couple together the layers. While bonded edges can provide less bulk (due to less layers) and minimize chaffing compared to cut-and-sewn edges, bonded edges can also provide enhanced strength, for example, at least along the neck opening 58, to help limit breast movement.

Figure 7B:
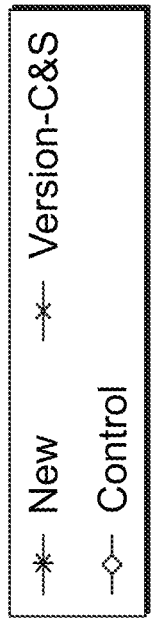
FIG. 7B is a chart of results from a study of breast movement (lateral nipple displacement) during running, comparing the athletic bra of FIG. 1 having a bonded-edge neck opening, an athletic bra having cut-and-sewn edge neck opening, and a control bra.
Figure 7A:
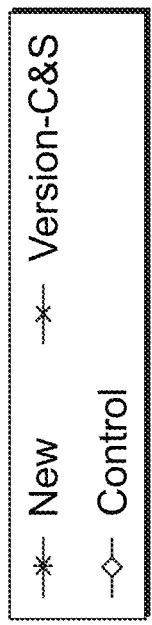
FIG. 7A is a chart of results from a study of breast movement (vertical nipple displacement) during running, comparing the athletic bra of FIG. 1 having a bonded-edge neck opening, an athletic bra having cut-and-sewn edge neck opening, and a control bra.

By way of example, referring to FIGS. 7A and 7B, a study was conducted of a wearer (size 34D) wearing the athletic bra 10 of some embodiments with a bonded neck opening

58, an athletic bra with a cut-and-sewn neck opening using an additional elastic layer, and an existing athletic bra providing a control bra, while running at 7 km/hr and 10 km/hr. FIG. 7A illustrates resulting 2D metrics measured from the bonded edge bra 10 (line 144), the cut-and-sewn edge bra (line 146), and the control bra (line 148). As shown in FIG. 7A, at 7 km/hr, the wearer experienced a 115.5% displacement with the bonded edge bra, a 115.4% displacement with the cut-and-sewn edge bra, and a 123.2% displacement with the control bra. At 10 km/hr, the wearer experienced a 118.3% displacement with the bonded edge bra, a 121.4% displacement with the cut-and-sewn edge bra, and a 132.2% displacement with the control bra.

Furthermore, FIG. 7B illustrates resulting 3D metrics measured from the bonded edge bra 10 (line 150), the cut-and-sewn edge bra (line 152), and the control bra (line 154). As shown in FIG. 7B, at 7 km/hr, the wearer experienced a 13.07 mm displacement with the bonded edge bra, a 14.67 mm displacement with the cut-and-sewn edge bra, and a 20.67 mm displacement with the control bra. At 10 km/hr, the wearer experienced a 16.46 mm displacement with the bonded edge bra, a 19.8 mm displacement with the cut-and-sewn edge bra, and a 26.54 mm displacement with the control bra. As shown in the results of FIGS. 7A and 7B, while a cut-and-sewn edge neck opening with elastic may have sufficient strength to help limit breast movement, at least at 7 km/hr running, the present bra with a bonded edge neck opening 58 provides more breast control, i.e., reducing lateral and vertical displacement, at 7 km/hr running and during higher intensity activity such as 10 km/hr running.

As illustrated above, the cup design, shell fabric, coverage type, and/or seam type of the athletic bra 10 of some embodiments, can positively impact its ability to provide improved breast support for high intensity activities. Notably, such features were shown to improve support without certain uncomfortable additions common to other high-impact athletic bras, such as underwires, rigid cups, or increased compression. However, it should be noted that the athletic bra 10 may incorporate one or more of these features in some embodiments. Furthermore, additional features may be incorporated into the athletic bra 10 of some embodiments to further enhance support and improve comfort. For example, in some embodiments, referring to FIGS. 1 and 2, the first strap 40 and the second strap 42 can each have a width W1 configured to support the front panel 38 and avoid digging into the wearer. In some embodiments, for a 34D size athletic bra 10, the width W1 of the straps 40, 42 can be about 3.5 cm. In some embodiments, the width W1 may be a minimum of 3.5 cm (i.e., 3.5 cm or greater). More generally, in some embodiments, the width W1 can range from 2 cm to 5 cm, from 2.5 cm to 4.5 cm, or from 3 cm to 4 cm. As another example, in some embodiments, as noted above, the underband 48 can include an elastic band. The underband 48, or at least the elastic band incorporated into the underband 48, can have a height H2 (shown in FIGS. 1 and 2) configured to support the breasts without digging into the torso 34 or riding up or down the torso 34 during high intensity activities. In some embodiments, for a 34D size athletic bra 10, the height H2 of the underband 48 can be about 3.8 cm, or about 3.5 cm. In some embodiments, the height H2 may be a minimum of 3.5 cm (i.e., 3.5 cm or greater). More generally, in some embodiments, the height H2 can range from 2 cm to 5 cm, from 2.5 cm to 4.5 cm, or from 3 cm to 4 cm. Furthermore, in some embodiments, the underband 48 can include two layers of elastic bands, which can further support the breasts 36 without decreasing comfort.

Any of the embodiments described herein may be modified to include any of the structures or methodologies disclosed in connection with different embodiments. Further, the present disclosure is not limited to athletic bras of the type specifically shown. Still further, aspects of the athletic bras of any of the embodiments disclosed herein may be modified to work with any type of bra, apparel, or other athletic equipment.

As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. An athletic bra, comprising: a front panel; a rear panel; a first strap and a second strap connecting the front panel to the rear panel; an underband coupled to the front panel and the rear panel;
   wherein the front panel, the rear panel, the first strap, the second strap, and the underband comprise: an outer shell and an inner layer, the outer shell including a fabric comprising polyamide and spandex; and a first cup and a second cup positioned within the front panel between the outer shell and the inner layer, each of the first cup and the second cup comprising a first layer of material and a second layer of material coupled together by an adhesive;
   wherein the first layer is a foam material and the second layer is a double knit fabric, and wherein at least one of the first cup and the second cup is coupled to at least one of the outer shell and the inner layer, such that the at least one of the first cup and the second cup is not removable.

2. The athletic bra of claim 1, wherein the adhesive is polyurethane hot melt.

3. The athletic bra of claim 1, wherein the fabric comprises between about 60-65% polyamide and between about 35-40% spandex.

4. The athletic bra of claim 3, wherein the fabric comprises 63% polyamide and 37% spandex.

5. The athletic bra of claim 4, wherein the outer shell and the inner layer are coupled together to form a seamless edge.

6. The athletic bra of claim 1, wherein the front panel is sized to fully cover breasts of a wearer when the athletic bra is worn.

7. The athletic bra of claim 6, wherein the front panel defines a central axis, and a total height of the front panel and the underband along the central axis of about 18 centimeters.

8. The athletic bra of claim 1, wherein the underband includes a height of about 3.8 centimeters.

9. The athletic bra of claim 1, wherein the first strap and the second strap each includes a uniform width along its length, wherein the width is about 3.5 centimeters.

10. The athletic bra of claim 1, wherein the first strap and the second strap each includes a varying width along its length.

11. The athletic bra of claim 1, wherein the first strap and the second strap each includes an adjustable length.

12. The athletic bra of claim 1, wherein the underband includes an adjustable circumference.

13. An athletic bra, comprising: an outer shell; an inner layer, which is configured to be positioned more proximal to the wearer than the outer shell when the athletic bra is worn; at least one of the outer shell and the inner layer including a fabric comprising polyamide and spandex; and a first cup and a second cup positioned between the outer shell and the inner layer, each of the first cup and the second cup comprising a first layer of material and a second layer of material coupled together by an adhesive;

wherein the first layer of material is a foam material and the second layer of material is a double knit fabric; and wherein at least one of the first cup and the second up is coupled to at least one of the outer shell and the inner layer, such that the at least one of the first cup and the second cup is not removable; wherein the outer shell and the inner layer are coupled together to form: a front panel; a rear panel; a first strap and a second strap connecting the front panel to the rear panel; and an underband coupled to the front panel and the rear panel.

14. The athletic bra of claim 13, wherein the adhesive is polyurethane hot melt.

15. The athletic bra of claim 13, wherein the fabric comprises between about 60-65% polyamide and between about 35-40% spandex.

16. The athletic bra of claim 15, wherein the fabric comprises 63% polyamide and 37% spandex.

17. The athletic bra of claim 13, wherein the front panel, the rear panel, the first strap, and the second strap comprise an outer edge that defines a neck opening; and wherein the outer shell and the inner layer are bonded together at the outer edge.

18. The athletic bra of claim 13, wherein a rear aperture is formed by a lower end of the rear panel and an upper end of the underband.

* * * * *